United States Patent
Meyer

(10) Patent No.: US 7,484,799 B2
(45) Date of Patent: Feb. 3, 2009

(54) SEAT ASSEMBLY

(75) Inventor: William A. Meyer, Sterling Heights, MI (US)

(73) Assignee: GPV, L.L.C., New Haven, MI (US)

( * ) Notice: Subject to any disclaimer, the term of this patent is extended or adjusted under 35 U.S.C. 154(b) by 476 days.

(21) Appl. No.: 11/201,190

(22) Filed: Aug. 11, 2005

(65) Prior Publication Data

US 2007/0035167 A1     Feb. 15, 2007

(51) Int. Cl.
*B60N 2/427* (2006.01)

(52) U.S. Cl. .............. 297/216.17; 297/344.19; 248/622

(58) Field of Classification Search .............. 297/216.1, 297/216.16, 216.17, 344.18, 344.19; 248/622–624
See application file for complete search history.

(56) References Cited

U.S. PATENT DOCUMENTS

| | | | | |
|---|---|---|---|---|
| 1,303,962 A | * | 5/1919 | Reed | 248/624 |
| 4,150,805 A | * | 4/1979 | Mazelsky | 297/216.1 |
| 4,456,295 A | * | 6/1984 | Francu | 297/211 |
| 5,176,356 A | * | 1/1993 | Lorbiecki et al. | 248/577 |
| 5,294,085 A | * | 3/1994 | Lloyd et al. | 248/562 |
| 5,383,705 A | * | 1/1995 | Voigt | 297/211 |
| 5,676,336 A | * | 10/1997 | Nefy et al. | 244/122 R |
| 5,746,395 A | * | 5/1998 | Peck et al. | 297/216.17 |
| 5,758,859 A | * | 6/1998 | Gonzalez | 248/624 |
| 5,871,257 A | * | 2/1999 | Dundes, Sr. | 297/314 |
| 6,237,889 B1 | * | 5/2001 | Bischoff | 248/622 |
| 6,267,440 B1 | * | 7/2001 | Hoffman | 297/216.1 |
| 6,851,746 B2 | * | 2/2005 | Faltings | 297/195.1 |
| 7,008,015 B2 | * | 3/2006 | Bischoff | 248/622 |

* cited by examiner

*Primary Examiner*—Peter R. Brown
(74) *Attorney, Agent, or Firm*—Novak Druce & Quigg LLP

(57) ABSTRACT

A seat assembly for an occupant of a vehicle possibly subjected to upsetting forces generally consisting of a base member mountable on a body portion of the vehicle, an occupant seat means for restraining an occupant positioned on the seat, means operatively interconnecting the base member and the seat for guiding the seat along a line of travel when the seat is displaced relative to the base member, means operatively interconnecting the base member and the seat for dampening a force imposed on the seat in first direction along the line of travel and means operatively interconnecting the base member and the seat for dampening a force imposed on the seat in a second direction along the line of travel.

5 Claims, 2 Drawing Sheets

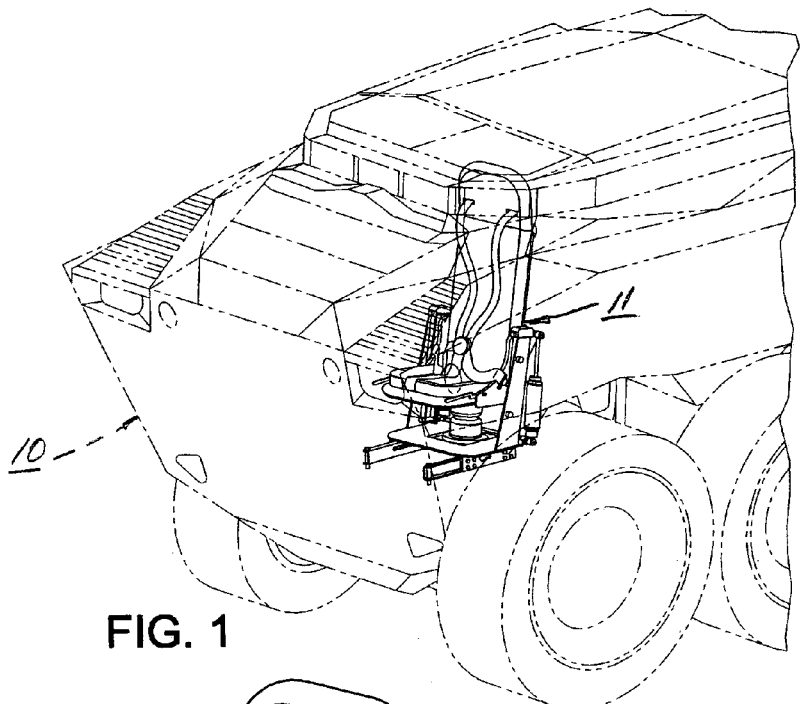
FIG. 1
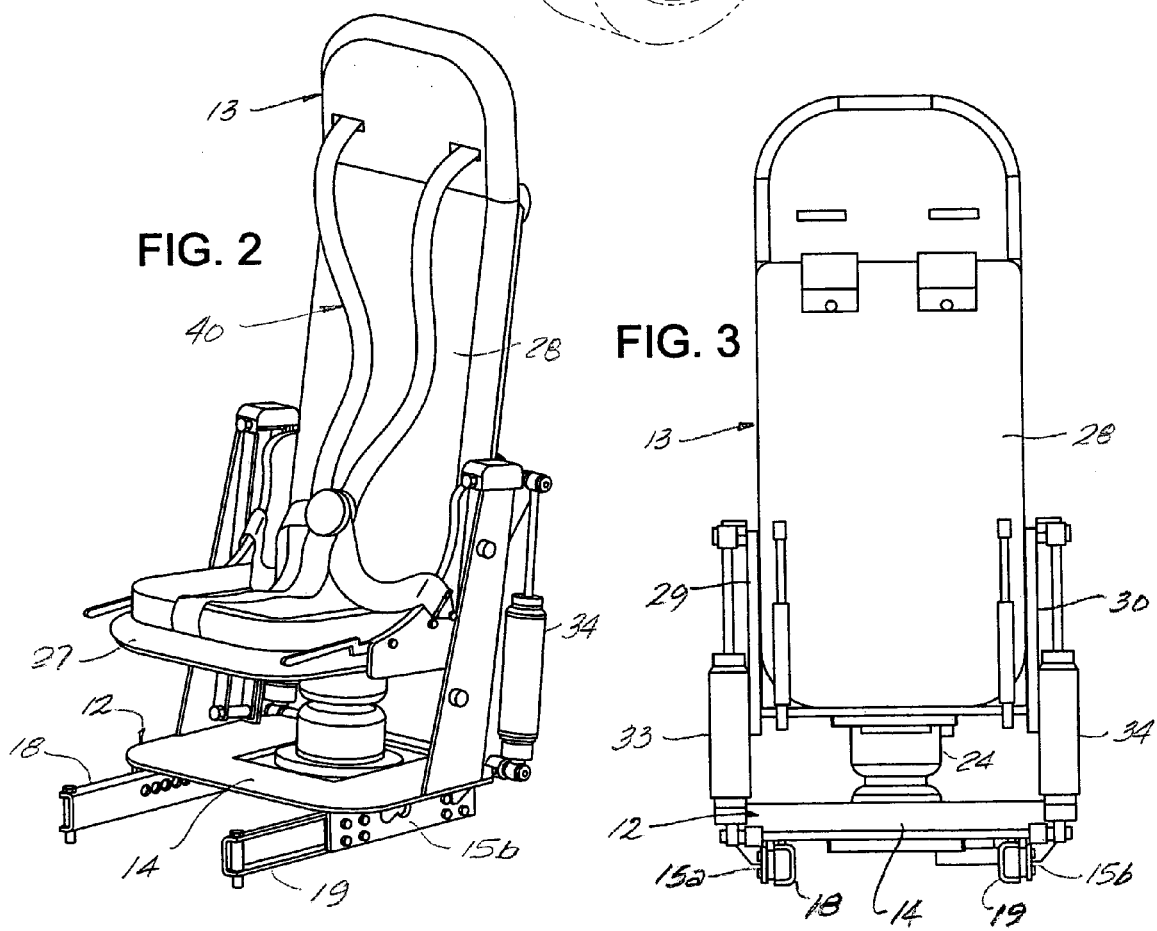
FIG. 2
FIG. 3

SEAT ASSEMBLY

This invention relates to a seat assembly and more particularly to a seat assembly for an occupant of a vehicle subject to upsetting forces apt to cause physical injury to such occupant.

BACKGROUND OF THE INVENTION

In certain vehicles such as personnel carriers commonly used for military and paramilitary purposes, such vehicles are subject to upsetting forces often caused by explosions of land mines, grenades, missiles, mortar rounds and gunfire. Under such conditions, it has been found that the principal causes of injury to the occupants of such vehicles has been the upwardly directed forces imposed on the occupants from an explosion at ground level, often hurling the occupants upwardly and perhaps colliding with the roofs of such vehicles, and the downwardly directed forces imposed as the result of the fall of such vehicles following their upward surge caused by the explosion. Typically, such occupants are intended to provide against such movements by the use of restraint systems but such systems alone have been found to be insufficient to prevent the forces of impact causing injury. Accordingly, it is the principal object of the present invention to provide a seat assembly for an occupant of a vehicle subject to upsetting or capsizing forces such as those caused by explosions of land mines and the like which will function to counteract such forces and thus minimize if not eliminate injury to such occupants under such circumstances.

SUMMARY OF THE INVENTION

The principal object of the present invention is achieved by providing a seat assembly for an occupant of a vehicle possibly subjected to upsetting forces which generally consists of a base member connectable to the body portion of the vehicle, an occupant seat, means for restraining an occupant positioned on such seat, means operatively interconnecting the base member and the seat for guiding the seat along a line of travel when the seat is displaced relative to the base member, means operatively interconnecting the base member and the seat for dampening a force imposed on the seat in a first direction along such line of travel and means operatively interconnecting the base member and the seat for dampening a force imposed on the seat in a second direction opposite the first direction.

BRIEF DESCRIPTION OF THE DRAWINGS

FIG. 1 is a perspective view of a vehicle shown in phantom lines and having a portion thereof broken away, and a seat assembly embodying the present invention shown in solid lines positioned within such vehicle;

FIG. 2 is an enlarged perspective view of the seat assembly shown in FIG. 1;

FIG. 3 is a front elevational view of the seat assembly shown in FIGS. 1 and 2.

DETAILED DESCRIPTION OF AN EMBODIMENT OF THE INVENTION

Figure 4:
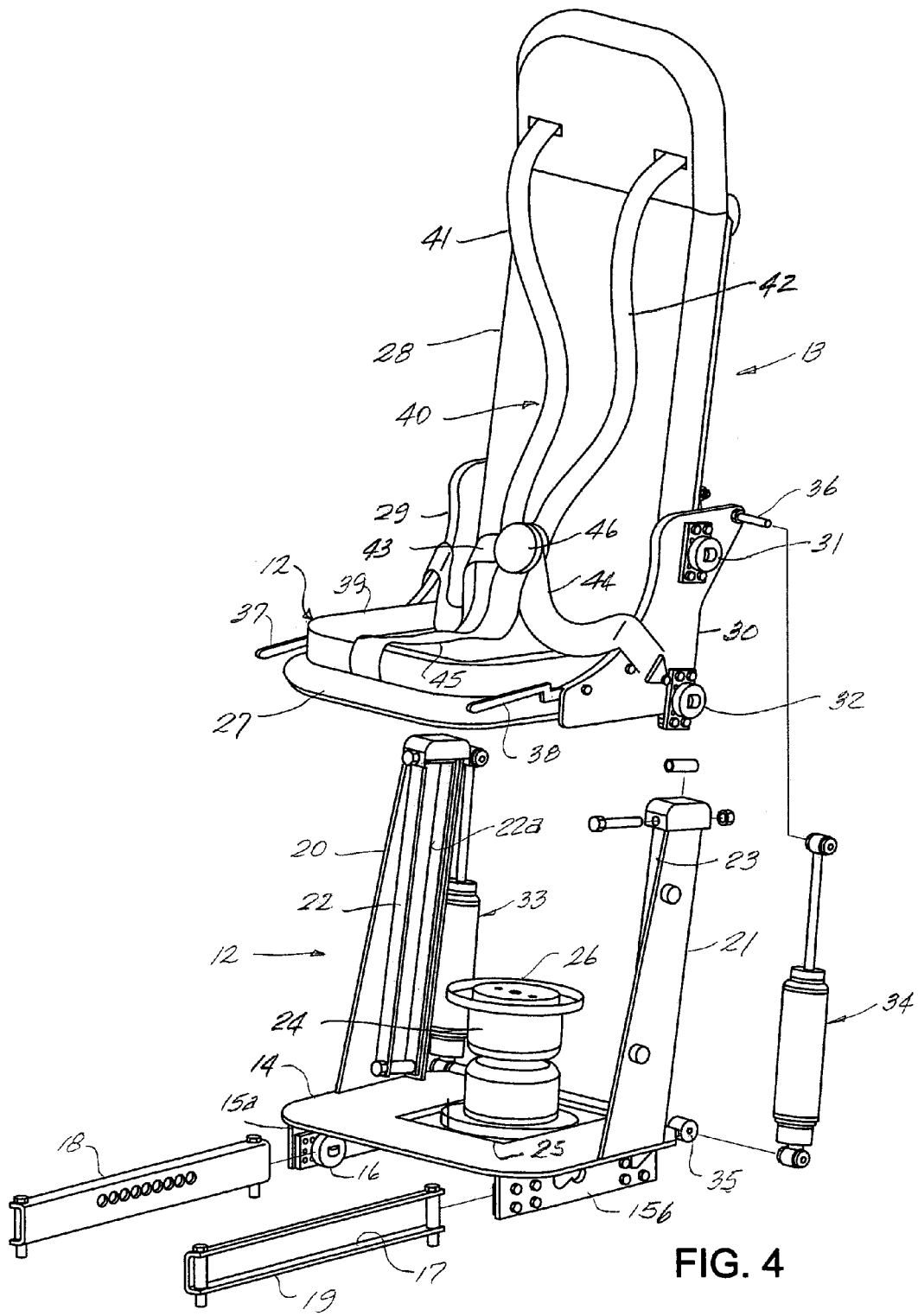
FIG. 4 is a perspective view of the seat shown in FIGS. 1 through 3, illustrating the components thereof in exploded relation.

Referring to FIG. 1 of the drawings, there is illustrated a vehicle 10 in which there is installed a seat assembly 11 embodying the present invention. The vehicle is of a type typically used for military and paramilitary purposes, often for transporting personnel. Such vehicles are more fully illustrated and described in PCT Applications Nos. PCT/US03/31305 filed Oct. 3, 2003 and PCT/US03/31307 filed Oct. 3, 2003, which are incorporated herein by reference. Typically, such vehicles are employed in warfare zones and other hostile areas and are subjected to a variety of upsetting forces caused by explosions produced by land mines, grenades, mortar rounds, missiles and gunfire. Such explosions typically have the effect of first lifting such vehicles and then dropping them causing occupants of the vehicles first to be thrown upwardly and then downwardly, striking interior portions of the vehicles and correspondingly sustaining physical injuries. Seat assembly 11 is functional in accommodating such passengers within such vehicles and minimizing if not eliminating any physical injury to such occupants upon being subjected to the forces imposed by such forces.

Generally, the seat assembly includes a base section 12 and a seat section 13. The seat section includes a base plate 14 having a pair of longitudinally disposed, laterally spaced members 15a and 15b provided with sets of rollers 16 on the inboard sides thereof which are adapted to ride in outwardly facing guide tracks 17 of a pair of longitudinally disposed, laterally spaced rails 18 and 19 firmly secured to the floor of the vehicle. Suitable means such as insertable pins and the like are provided for locking the seat assembly in a selected position along rails 18 and 19. Extending upwardly from the side portions of base plate 14 is a pair of upright members 20 and 21, provided on the inner sides thereof with a pair of guide rails 22 and 23 having a pair of guide tracks 22a and 23a (not shown) for guiding the seat section upwardly and downwardly along a line of travel disposed at an obtuse angle relative to the horizontal. Also mounted on base plate 13, between upright members 20 and 21, is an air spring 24 having a lower base portion 25 firmly secured to base plate 14 and an upper mounting portion 26.

Seat section 13 includes a seat portion 27 and a back rest portion 28. Secured to the sides of the seat and back rest portions is set of plates 29 and 30. As best shown in FIG. 4, side plate 30 is provided with a set of spaced rollers 31 and 32 which are adapted to be received within and ride along the guide track of rail 23. Similarly, side plate 29 is provided with a set of rollers which are received within and are adapted to ride along guide track 22a.

When the seat section is mounted on the base section with the rollers of side plates 29 and 30 received within and guided along the guide tracks of rails 22 and 23, the seat portion 21 will rest upon mounting plate 26 of air spring 24 and be firmly secured thereto.

Operatively interconnecting the base and seat sections of the seat assembly is a pair of shock absorbers 33 and 34. The base end of shock absorber 34 is pivotally connected to base plate 14 as at 35 and the free end of the rod member thereof is pivotally connected to a pin on the upper end of side plate 30 as at 36. Shock absorber 33 similarly interconnects base plate and side plate 29 so that as the seat section is displaced relative to the base section along guide tracks 22a and 23a, the shock absorbers will dampen the movement of the seat section relative to the base section.

The seat section further is provided with a pair of pivotal handles 37 and 38 to allow the seat occupant to adjust and lock the angle of the back rest relative to the seat portion, a cushion pad 39 extending from the seat portion to the back rest portion and a restraining harness 40. The harness is a five point harness including a pair of shoulder straps 41 and 42, a pair of leg straps 43 and 44 and a center strap 45 detachably securable together by a buckle 46.

The seat assembly is configured and structured so that the fore and aft position of the assembly may be adjusted along rails 18 and 19, the seat section will rest on air spring 24 and be guided relative to the base section along guide tracks 22a and 23a, the back rest portion of the seat section may be adjusted relative to the seat portion thereof by means of handles 37 and 38 and the occupant will be secured to the seat section by means of restraining harness 40.

In the operation of the seat assembly, whenever an occupant is positioned on the assembly and restrained thereon by means of harness 40, and the vehicle incurs an explosion, causing the vehicle first to surge upwardly and then drop to the ground, the impact of the force of the explosion hurling the vehicle upwardly will first cause the seat section to displace upwardly relative to the base section along guide tracks 22a and 23a with the force of such motion being dampened by the action of shock absorbers 33 and 34, thus minimizing the upper movement of the occupant and possible collision with the roof of the vehicle resulting in head, neck and/or back injuries to the occupant. As the vehicle then drops to the ground, the seat section will be caused to displace relative to the base section downwardly along guide tracks 22a and 22b, compressing air spring 24 and thus cushioning such downward force. With the dampening action of the shock absorbers and the cushioning action of the air spring, the upward and downward movements of the occupant restrained in the seat section of the assembly will minimize if not eliminate collision of the occupant with interior portions of the vehicle resulting in physical injury to the occupant.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A seat assembly for an occupant of a vehicle possibly subjected to upsetting forces, comprising:
    a base member mountable on a body portion of said vehicle;
    first means mounted directly on said base member for dampening forces applied along a line of travel in a first direction;
    a seat mounted directly on top of said first means;
    second means spaced from said first means directly interconnecting said base member and said seat for dampening forces applied along said line of travel in a second direction opposite to said first direction; and
    third means of guiding said seat along said line of travel including a set of guide tracks disposed on said base member and a set of rollers disposed on said seat rideable along said guide tracks.

2. A seat assembly according to claim 1 wherein said body of said vehicle includes a fourth guiding means and said member is supported on and displaceable along said fourth guiding means, and including means for detachably locking said base member at selected location along said fourth guiding means.

3. A seat assembly according to claim 1 including means for detachably securing an occupant in said seat.

4. A seat assembly according to claim 1 wherein said first dampening means comprises an air spring.

5. A seat assembly according to claim 1 wherein said second dampening means comprises at least one shock absorber operatively directly interconnecting said based member and said seat.

* * * * *